(12) United States Patent
Cuthbert et al.

(10) Patent No.: US 9,953,631 B1
(45) Date of Patent: Apr. 24, 2018

(54) AUTOMATIC SPEECH RECOGNITION TECHNIQUES FOR MULTIPLE LANGUAGES

(71) Applicant: Google LLC, Mountain View, CA (US)

(72) Inventors: Alexander Jay Cuthbert, Oakland, CA (US); Masakazu Seno, Cupertino, CA (US); Barak Turovsky, Mountain View, CA (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 14/706,243

(22) Filed: May 7, 2015

(51) Int. Cl.
*G10L 15/00* (2013.01)
*G10L 15/26* (2006.01)

(52) U.S. Cl.
CPC .......... *G10L 15/005* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,085,160 A | 7/2000 | D'hoore et al. | |
| 6,532,446 B1 | 3/2003 | King | |
| 7,149,688 B2 | 12/2006 | Schalkwyk | |
| 7,292,980 B1 | 11/2007 | August et al. | |
| 7,640,159 B2 | 12/2009 | Reich | |
| 7,899,669 B2 | 3/2011 | Gadbois | |
| 8,069,030 B2 | 11/2011 | Iso-Sipila et al. | |
| 8,972,260 B2 | 3/2015 | Weng et al. | |
| 2006/0253272 A1* | 11/2006 | Gao | G10L 13/00 704/2 |
| 2011/0307241 A1* | 12/2011 | Waibel | G10L 15/265 704/2 |
| 2013/0238336 A1* | 9/2013 | Sung | G10L 15/32 704/255 |
| 2014/0244686 A1* | 8/2014 | Tran | G10L 15/22 707/775 |
| 2015/0100300 A1* | 4/2015 | Nazarian | H04N 21/432 704/2 |

* cited by examiner

*Primary Examiner* — Richa Mishra
(74) *Attorney, Agent, or Firm* — Fish & Richardson P.C.

(57) ABSTRACT

Computer-implemented techniques can include obtaining languages for automatic speech recognition, the languages being associated with a plurality of users and receiving an input indicative of a request to provide speech input. In response to receiving the input, a first indication that automatic speech recognition (ASR) is being performed in each of the plurality of languages can be displayed. A speech input from one of the plurality of users can be received and ASR can identify one of the languages associated with the speech input to obtain a detected language. In response to obtaining the detected language, a second indication that ASR is being performed in the detected language can be displayed. The speech input can be transcribed and translated to another one of the plurality of languages to obtain a translated text that can be displayed.

12 Claims, 4 Drawing Sheets

AUTOMATIC SPEECH RECOGNITION TECHNIQUES FOR MULTIPLE LANGUAGES

FIELD

The present disclosure is directed to automatic speech recognition and, more particularly, to automatic speech recognition techniques for multiple languages.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automatic speech recognition systems can be configured to transcribe speech to text. In one example scenario, two users that speak different languages may utilize an automatic speech recognition system to transcribe each user's speech and then translate their speech to the language spoken/understood by the other user. This allows the users to communicate with each other in real-time without the need of a human translator. Conventional automatic speech recognition systems, however, may only be configured to recognize speech in a single language. Thus, the users may be required to manually switch between the particular language that the automatic speech recognition is listening for. This manual switching is time consuming and can interrupt the flow of the conversation between the users.

SUMMARY

A computer-implemented technique is presented. The technique can include obtaining, at a computing device having one or more processors, a plurality of languages for automatic speech recognition, the plurality of languages being associated with a plurality of users; receiving, at the computing device, an input indicative of a request to provide speech input; receiving, by the computing device, a speech input from one of the plurality of users; performing, by the computing device, automatic speech recognition on the speech input to identify one of the plurality of languages associated with the speech input to obtain a detected language; obtaining, by the computing device, a transcription of the speech input to obtain a text in the detected language; obtaining, by the computing device, a translation of the text from the detected language to another one of the plurality of languages to obtain a translated text; and displaying, by the computing device, the translated text.

A computing device and a non-transitory computer-readable medium are also presented. The computing device can have one or more processors configured to perform operations, and the computer-readable medium can have instructions stored thereon that, when executed by one or more processors of a computing device, cause the computing device to perform operations. The operations can include obtaining a plurality of languages for automatic speech recognition, the plurality of languages being associated with a plurality of users; receiving an input indicative of a request to provide speech input; receiving a speech input from one of the plurality of users; performing automatic speech recognition on the speech input to identify one of the plurality of languages associated with the speech input to obtain a detected language; obtaining a transcription of the speech input to obtain a text in the detected language; obtaining a translation of the text from the detected language to another one of the plurality of languages to obtain a translated text; and displaying the translated text.

In some implementations, the technique or operations can further include in response to receiving the input, displaying a first indication that the computing device is performing automatic speech recognition in each of the plurality of languages. In some implementations, the technique or operations can further include in response to obtaining the detected language, displaying a second indication that the computing device is performing automatic speech recognition in the detected language.

In some implementations, the first indication is highlighted icons displaying the plurality of languages, respectively, and wherein the second indication is a highlighted icon displaying the detected language and non-highlighted icons displaying a remainder of the plurality of languages, respectively. In some implementations, the technique or operations can further include displaying, by the computing device, a third indication of whether automatic speech recognition is currently being performed. In some implementations, the third indication is a highlighted icon from when the request is received until a completion of the speech input, and wherein the third indication is a non-highlighted icon upon the completion of the speech input.

In some implementations, the technique or operations can further include displaying, by the computing device, the text in the detected language in response to obtaining the text, wherein the text is displayed in a first area on a display of the computing device, and wherein the translated text is displayed in a separate second area on the display. In some implementations, the text is displayed in at least one of a first color and a first style, and wherein the translated text is displayed in at least one of a different second color and a different second style.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, conventional automatic speech recognition systems may only be configured to recognize speech in a single language. Accordingly, automatic speech recognition techniques for multiple languages are presented. These techniques can involve displaying user interfaces indicative of an operative state of the automatic speech recognition system. This operative state can include, for example, listening for a plurality of languages, listening for a detected language, and displaying transcribed text in the detected language and translated text in another language. In some implementations, indications are provided as to the specific operative state (e.g., listening for a specific detected language). These user interfaces can provide for faster, more efficient speech input, transcription, and translation for communication between multiple users that speak/understand different languages, which in turn can create an improved user experience.

Figure 1:
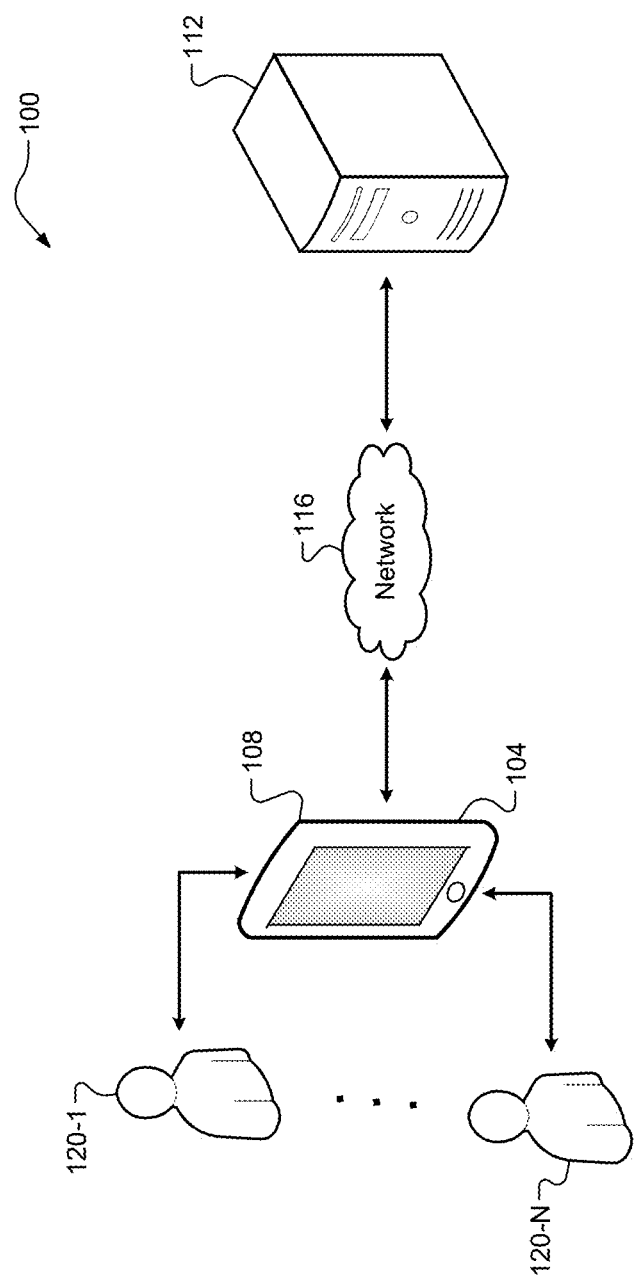
FIG. 1 is a diagram of an example computing system including an example computing device according to some implementations of the present disclosure.

Referring now to FIG. 1, an example computing system 100 is illustrated. The computing system 100 can include an example computing device 104 according to some implementations of the present disclosure. Examples of the computing device 104 include, but are not limited to, a desktop computer, a laptop computer, a tablet computer, and a mobile phone. The computing device 104 can include a user interface 108, such as a touch display. The computing system 100 can further include a server 112 in communication with the computing device 104 via a network 116. The computing device 104 can be operated by a plurality of users 120-1 . . . 120-N (collectively "users 120"). For example only, there may be two users 120 (N=2) that are operating the computing device 104 according to the techniques of the present disclosure.

Figure 2:
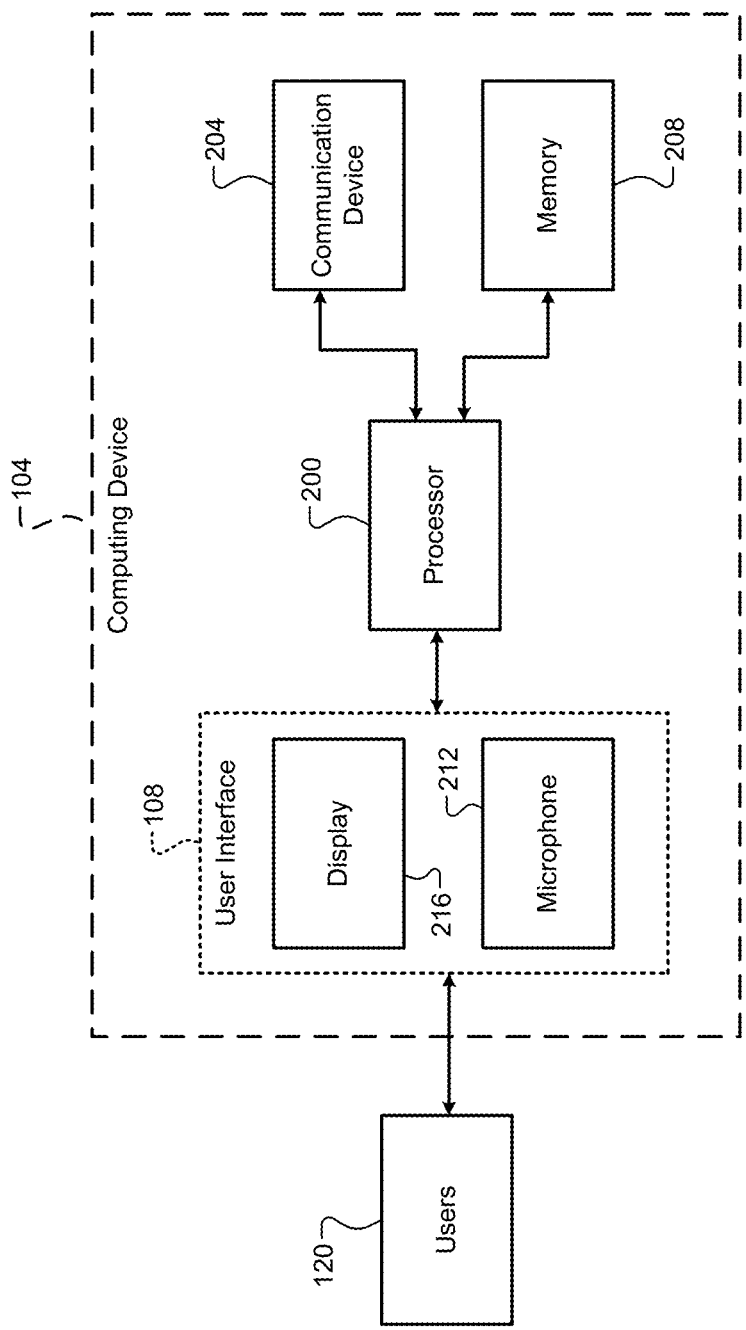
FIG. 2 is a functional block diagram of the example computing device of FIG. 1.

Referring now to FIG. 2, a functional block diagram of the computing device 104 is illustrated. The computing device 104 can include the user interface 108, a processor 200, a communication device 204, and a memory 208. The user interface 108 can include a microphone 212 and a display 216. The microphone 212 can be implemented in the computing device 104 or can be an accessory device in communication with the computing device 104 (e.g., via short-range wireless communication). In one implementation, the display 216 may be a touch display configured to both output information and receive touch input. The display 216 could alternatively be a non-touch display, and the user interface 108 could include user input devices (not shown), such as a physical keyboard and/or other buttons. While a single microphone 212 is shown, multiple microphones could be implemented. The term "processor" as used herein can refer to both a single processor and two or more processors operating in a parallel or distributed architecture.

The processor 200 can be configured to control operation of the computing device 104. Example functions performed by the processor 200 include, but are not limited to, loading/executing an operating system of the computing device 104, controlling information output at the user interface 108, interpreting input received at the user interface 108, controlling communication via the communication device 204, and controlling read/write operations at the memory 208. The communication device 204 can be any suitable device, such as a transceiver, that is configured for communication via the network 116 and/or other networks (e.g., a short-range wireless communication network associated with an accessory microphone). The memory 208 can be any suitable storage medium (flash, hard disk, etc.) configured to store information at the computing device 104. The processor 200 can also be configured to perform at least a portion of the automatic speech recognition techniques of the present disclosure, which are discussed in greater detail below.

The computing device 104 can obtain a plurality of languages for automatic speech recognition. The plurality of languages can be associated with the plurality of users 120. These languages may be retrieved from the memory 208, retrieved via the network 116 (e.g., from a server, such as server 112), or manually input by the users 120. These languages represent preferred languages of the users 120 (e.g., languages spoken/understood by the users 120). In some implementations, a particular user 120 may be associated with multiple languages. For example only, the English language may be associated with one of the users 120 and the Spanish language may be associated with another one of the users 120. In response to receiving an input indicative of a request to provide speech input, the computing device 104 can perform automatic speech recognition.

This input could be a touch input (e.g., a spot input of a microphone icon) or another suitable input indicative of a request to provide speech input. The computing device 104 can display a first indication that the computing device 104 is performing automatic speech recognition in each of the plurality of languages. In some implementations, there can be a delay between receiving the request and displaying the first indication (e.g., "Please wait . . . ") while the computing device 104 configures for automatic speech recognition. A different indication could also be provided during this period (e.g., outlining icons vs. highlighting). The computing device 104 can then receive a speech input from one of the plurality of users 120 and perform automatic speech recognition on the speech input to identify one of the plurality of languages associated with the speech input to obtain a detected language. In contrast to auto-detection of the language(s), in some implementations the language(s) for the computing device 104 to listen for are preselected or otherwise predetermined for the users 120. For example, before beginning speech input, one of the users 120 may have selected English and another one of the users 120 may have selected Spanish.

Figure 3:
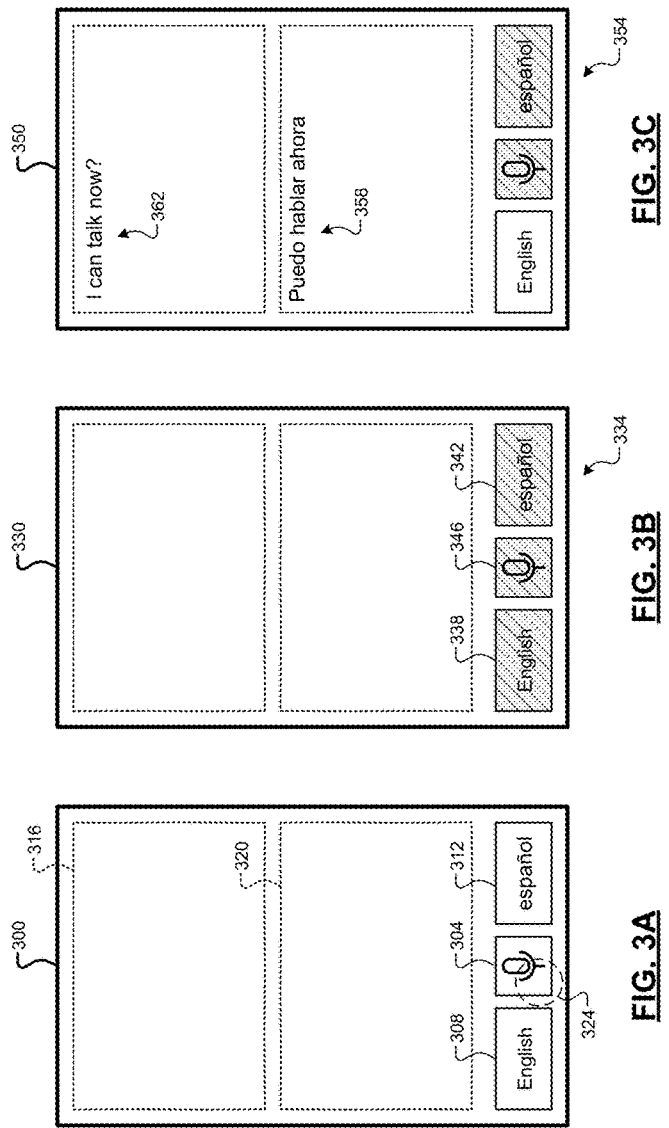
FIGS. 3A-3C are diagrams of example user interfaces displayed by the example computing device of FIG. 1.

Referring now to FIG. 3A and with continued reference to FIG. 2, an example user interface 300 is illustrated. The user interface 300 can include a microphone or other speech input request icon 304 and language icons 308, 312 corresponding to the plurality of languages. The term "icon" as used herein can refer to any touch-selectable graphic or other displayed graphic that instructs the users 120 how to select its corresponding language for automatic speech recognition (e.g., using a nearby physical button). While two language icons 308, 312 are illustrated, three or more language icons could be displayed and utilized. As shown, the language icons 308, 312 correspond to English and Spanish respectively. In some implementations, each of the language icons 308, 312 may indicate their corresponding language in that language (e.g., "español" for the Spanish icon). The user interface 300 can also include two display areas 316, 320, which are discussed in greater detail below. The microphone icon 304 can be used by the users 120 to provide the request for automatic speech recognition, such as a via a touch input 324.

Referring now to FIG. 3B and with continued reference to FIG. 2, another example user interface 330 is illustrated. In response to receiving the request, the computing device 104 can display a first indication that the computing device 104 is performing automatic speech recognition in each of the plurality of languages. As shown, the first indication 334 can include highlighted language icons 338, 342 displaying English and Spanish (español), respectively. The term "highlight" as used herein can refer to modifying the display of a particular icon such that it is noticeable to the users 120. Examples of highlighting can include changing a color, style, and/or weight/thickness of the icon borders and changing a fill color, style, or shading of the icon. While the speech input is being received, a highlighted microphone icon 346 is displayed (e.g., to indicate that the microphone 212 is currently listening). Once a sufficient amount of speech input has been received, the computing device 104 can perform automatic speech recognition to detect a language of the speech input.

Referring now to FIG. 3C and with continued reference to FIG. 2, another example user interface 350 is illustrated. In response to obtaining the detected language, the computing device 104 can display a second indication 354 that the computing device 104 is performing automatic speech recognition in the detected language. As shown, the second indication 354 may include the highlighted language icon 342 displaying the detected language (Spanish, or español) and a non-highlighted or original language icon 308 displaying the other of the plurality of languages (English). Because speech input is still being received, the highlighted microphone icon 346 remains displayed. When the speech input completes, however, a non-highlighted microphone icon (not shown) could be displayed. Once the speech input completes, the computing device 104 can obtain a transcription of the speech input to obtain a text 358 in the detected language.

As shown, the text 358 in the detected language (Spanish) reads "Puedo hablar ahora." In some implementations, the computing device 104 may display the text 354 in the detected language. As shown, the text 358 can be displayed in display area 316 of the user interface 350. The computing device 104 can obtain a translation of the text 358 from the detected language (Spanish) to another one of the plurality of languages (English) to obtain a translated text 362, which can then be displayed. As shown, the translated text 362 in the target language (English) reads "I can talk now?" In some implementations, the computing device 104 may display the translated text 362 in display area 312 of the user interface 350. In some implementations, the text 358 and the translated text 362 can have different colors and/or different styles (font type, font formatting/style, etc.). The different colors/styles may make it easier for the users 120 to discern between the text and the translated text.

In some implementations, upon displaying the translated text 362, the computing device 104 can transition back to (i.e., restart) receiving speech input. By repeatedly transitioning back and forth between receiving speech input and displaying translated text, a continuous conversation experience can be achieved without receiving additional or continuous control inputs by the users 120. In some implementations, an audio segment can be played by the computing device 104 (e.g., using a speaker) in conjunction with displaying the translated text 362. This audio segment can represent speech corresponding to the translated text 362, and can be generated at the computing device 104 and/or at the server 112. By providing audio segments corresponding to simulated speech of the translated text 362, the continuous conversation experience can be further enhanced because the users 120 may not need to read the translated text 362, instead relying upon the simulated speech.

While the processes above are discussed as being performed by the computing device 104, at least some of the processes discussed above may be performed, at least partially, at the server 112 and/or another suitable server in communication with the computing device 104 via the network 116. For example, the server 112 may be configured to perform language translation and return the translated text in response to a request. This translation could be performed using received transcribed text or using a received audio segment. The server 112 could also be configured to perform transcription using a received audio file corresponding to the speech input and return the text in response to a request. In some implementations, results from the server 112 could be returned to the computing device 104 at different times due to differences in processing times. For example, the server 112 could return the transcribed and/or translated texts prior returning a translated audio segment representing the simulated speech. The server 112 could also be configured to store the plurality of languages (e.g., corresponding to identifiers associated with the users 120) and return the plurality of languages in response to a request.

Figure 4:
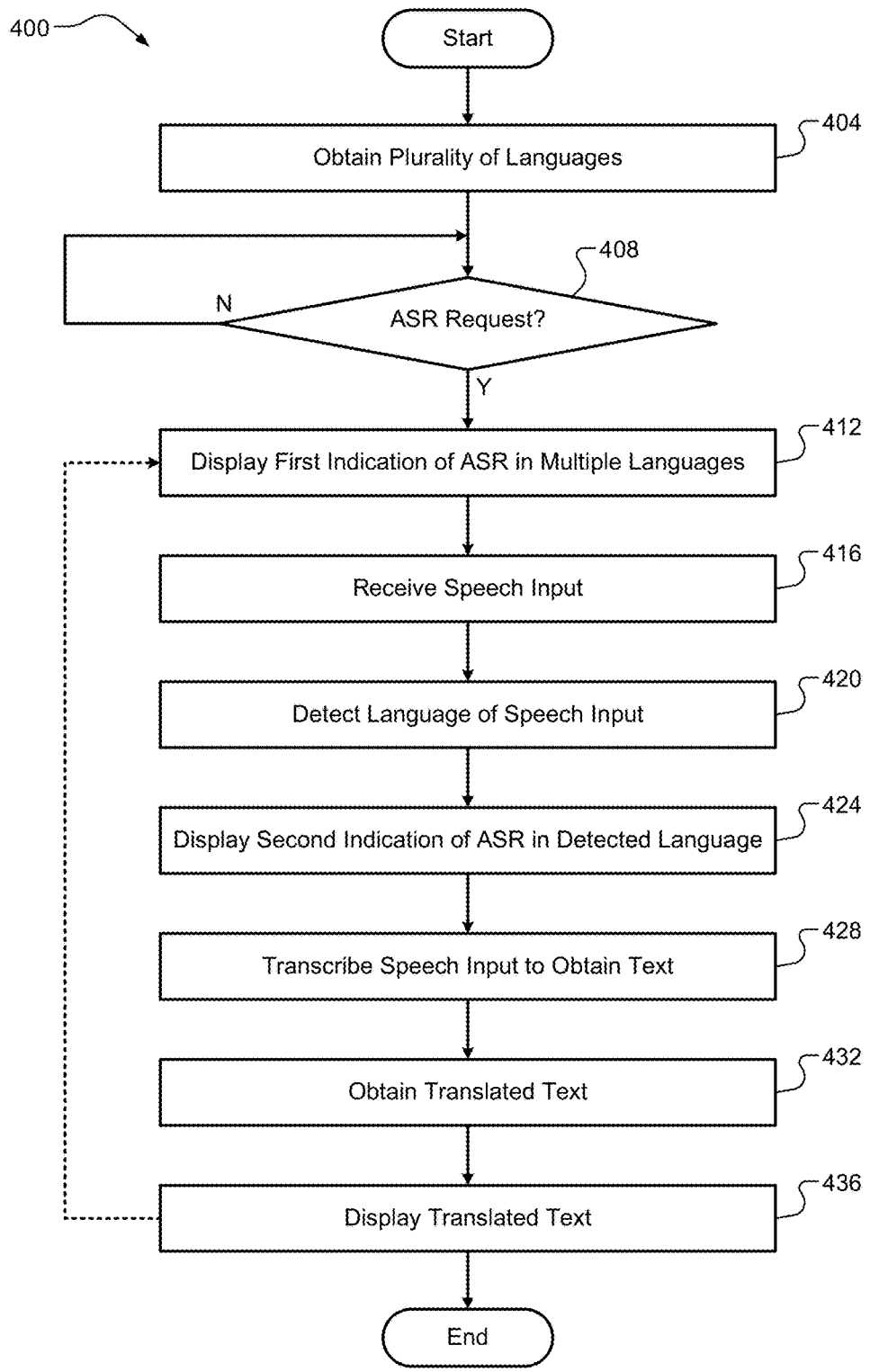
FIG. 4 is a flow diagram of an example technique for automatic speech recognition for multiple languages according to some implementations of the present disclosure.

Referring now to FIG. 4, a flow diagram of an example technique 400 for automatic speech recognition for multiple languages is illustrated. At 404, the computing device 104 can obtain a plurality of languages associated with the plurality of users 120. At 408, the computing device 104 can detect an input indicative of a request to for automatic speech recognition (ASR) (e.g., a request to provide speech input). When the input is received, the technique 400 can proceed to 412. Otherwise, the technique 400 can return to 408. At 412, the computing device 104 can optionally display a first indication that the computing device 104 is performing automatic speech recognition in each of the plurality of languages (i.e., in multiple languages). For example only, the highlighted icons 338, 342 indicative of the plurality of languages may be displayed. At 416, the computing device 104 can receive a speech input from one of the plurality of users 116.

At 420, the computing device 104 can perform automatic speech recognition on the speech input to identify one of the plurality of languages associated with the speech input to obtain a detected language. At 424, the computing device 104 can optionally display a second indication in response to obtaining the detected language. The second indication can be indicative of the computing device 104 performing automatic speech recognition in the detected language. For example only, the highlighted icon 342 indicative of the detected language may be displayed and the non-highlighted icon(s) 308 indicative of a remainder of the plurality of languages may be displayed. At 428, the computing device 104 can obtain a transcription of the speech input to obtain a text in the detected language. At 432, the computing device 104 can obtain a translation of the text from the detected language to another one of the plurality of languages to obtain a translated text. At 436, the computing device 104 can display the translated text. The technique 400 can then end or return to 404. In some implementations, the technique 400 may then return to 408 to receive another request for transcription and translation of additional speech input. In other implementations, the technique 400 can return to 412 and restart receiving speech input, thereby providing for a continuous conversation experience for the users 120.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
obtaining, at a computing device having one or more processors, a plurality of languages for automatic speech recognition, the plurality of languages being associated with a plurality of users;
receiving, at the computing device, an input indicative of a request to provide speech input;
receiving, by the computing device, a speech input from one of the plurality of users;
in response to receiving the input:
 displaying, by the computing device, a first indication that the computing device is performing automatic speech recognition in two or more of the plurality of languages, the first indication comprising highlighted icons displaying the two or more of the plurality of languages, and
 performing, by the computing device, automatic speech recognition on the speech input in the two or more of the plurality of languages to identify one of the plurality of languages associated with the speech input to obtain a detected language;
obtaining, by the computing device, a transcription of the speech input to obtain a text in the detected language;
in response to obtaining the text, displaying, by the computing device, the text in a first area on a display of the computing device;
obtaining, by the computing device, a translation of the text from the detected language to another one of the plurality of languages to obtain a translated text; and
displaying, by the computing device, the translated text in a separate second area on the display,
wherein the highlighted icons displaying the two or more of the plurality of languages are displayed in a separate third area of the display that is distinct from the first and second areas of the display.

2. The computer-implemented method of claim 1, further comprising in response to obtaining the detected language, displaying, by the computing device, a second indication that the computing device is performing automatic speech recognition in the detected language.

3. The computer-implemented method of claim 2, wherein the second indication is a highlighted icon displaying the detected language and non-highlighted icons displaying a remainder of the two or more of the plurality of languages, respectively.

4. The computer-implemented method of claim 3, further comprising displaying, by the computing device, a third indication of whether automatic speech recognition is currently being performed, wherein the third indication is a highlighted icon from when the request is received until a completion of the speech input, and wherein the third indication is a non-highlighted icon upon the completion of the speech input.

5. The computer-implemented method of claim 1, wherein the text is displayed in at least one of a first color and a first style, and wherein the translated text is displayed in at least one of a different second color and a different second style.

6. A computing device having one or more processors configured to perform operations comprising:
obtaining a plurality of languages for automatic speech recognition, the plurality of languages being associated with a plurality of users;
receiving an input indicative of a request to provide speech input;
receiving a speech input from one of the plurality of users;
in response to receiving the input:
 displaying a first indication that the computing device is performing automatic speech recognition in two or more of the plurality of languages, the first indication comprising highlighted icons displaying the two or more of the plurality of languages,
 performing automatic speech recognition on the speech input in the two or more of the plurality of languages to identify one of the plurality of languages associated with the speech input to obtain a detected language, and
 in response to obtaining the detected language, displaying a second indication that the computing device is performing automatic speech recognition in the detected language, wherein the second indication is a highlighted icon displaying the detected language and non-highlighted icons displaying a remainder of the two or more of the plurality of languages, respectively;
obtaining a transcription of the speech input to obtain a text in the detected language;
obtaining a translation of the text from the detected language to another one of the plurality of languages to obtain a translated text; and
displaying the translated text.

7. The computing device of claim 6, wherein the operations further comprise displaying a third indication of whether automatic speech recognition is currently being performed, wherein the third indication is a highlighted icon from when the request is received until a completion of the speech input, and wherein the third indication is a non-highlighted icon upon the completion of the speech input.

8. The computing device of claim 6, wherein the operations further comprise displaying the text in the detected language in response to obtaining the text, wherein the text is displayed in a first area on a display of the computing device, and wherein the translated text is displayed in a separate second area on the display.

9. The computing device of claim 8, wherein the text is displayed in at least one of a first color and a first style, and wherein the translated text is displayed in at least one of a different second color and a different second style.

10. A non-transitory computer-readable medium having instructions stored thereon that, when executed by one or more processors of a computing device, cause the computing device to perform operations comprising:
obtaining a plurality of languages for automatic speech recognition, the plurality of languages being associated with a plurality of users;
receiving an input indicative of a request to provide speech input;
receiving a speech input from one of the plurality of users;
in response to receiving the input:
 displaying a first indication that the computing device is performing automatic speech recognition in two or more of the plurality of languages, the first indication comprising highlighted icons displaying the two or more of the plurality of languages,
 performing automatic speech recognition on the speech input in the two or more of the plurality of languages to identify one of the plurality of languages associated with the speech input to obtain a detected language, and in response to obtaining the detected language, displaying a second indication that the computing device is performing automatic speech recognition in the detected language, wherein the second indication is a highlighted icon displaying the detected language and non-highlighted icons displaying a remainder of the two or more of the plurality of languages, respectively;

obtaining a transcription of the speech input to obtain a text in the detected language;

obtaining a translation of the text from the detected language to another one of the plurality of languages to obtain a translated text; and displaying the translated text.

11. The computer-readable medium of claim 10, wherein the operations further comprise displaying a third indication of whether automatic speech recognition is currently being performed, wherein the third indication is a highlighted icon from when the request is received until a completion of the speech input, and wherein the third indication is a non-highlighted icon upon the completion of the speech input.

12. The computer-readable medium of claim 10, wherein the operations further comprise displaying the text in the detected language in response to obtaining the text, wherein the text is displayed in a first area on a display of the computing device, wherein the translated text is displayed in a separate second area on the display, wherein the text is displayed in at least one of a first color and a first style, and wherein the translated text is displayed in at least one of a different second color and a different second style.

* * * * *